US009223626B2

(12) United States Patent
Factor et al.

(10) Patent No.: US 9,223,626 B2
(45) Date of Patent: Dec. 29, 2015

(54) TASK EXECUTION AND MANAGEMENT IN A CLUSTERED COMPUTING ENVIRONMENT

(75) Inventors: Michael E. Factor, Haifa (IL); David Hadas, Zichron Yaakov (IL); Elliot K. Kolodner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/598,638

(22) Filed: Aug. 30, 2012

(65) Prior Publication Data

US 2014/0068620 A1    Mar. 6, 2014

(51) Int. Cl.
| | | |
|---|---|---|
| *G06F 9/46* | (2006.01) | |
| *G06F 9/50* | (2006.01) | |
| *G06F 11/14* | (2006.01) | |
| *G06F 11/20* | (2006.01) | |

(52) U.S. Cl.
CPC .......... *G06F 9/5027* (2013.01); *G06F 11/1438* (2013.01); *G06F 11/2035* (2013.01); *G06F 11/2028* (2013.01); *G06F 11/2046* (2013.01); *G06F 2209/508* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 2001/0034792 | A1* | 10/2001 | Swildens | 709/238 |
| 2007/0256081 | A1* | 11/2007 | Comer | 719/316 |
| 2008/0307258 | A1* | 12/2008 | Challenger et al. | 714/20 |
| 2009/0210882 | A1* | 8/2009 | Srivastava et al. | 718/107 |
| 2009/0235251 | A1 | 9/2009 | Li et al. | |
| 2010/0186020 | A1* | 7/2010 | Maddhirala et al. | 718/105 |
| 2011/0016214 | A1* | 1/2011 | Jackson | 709/226 |
| 2012/0047394 | A1 | 2/2012 | Jain et al. | |
| 2012/0166390 | A1* | 6/2012 | Merriman et al. | 707/613 |
| 2013/0067493 | A1* | 3/2013 | Dion et al. | 719/318 |

OTHER PUBLICATIONS

Rosalie et al., "Fast and Transparent Recovery for Continuous Availability of Cluster-based Servers", Proceedings of the 2006 ACM Symposium on Principles and Practice of Parallel Programming (PPoPP06), pp. 221-229, Mar. 2006.

* cited by examiner

*Primary Examiner* — Dong Kim
(74) *Attorney, Agent, or Firm* — Noah A. Sharkan; Suzanne Erez (57) ABSTRACT

Machines, systems and methods for task management in a computer implemented system. The method comprises registering a task with brokers residing on one or more nodes to manage the execution of a task to completion, wherein a first broker is accompanied by a first set of worker threads co-located on the node on which the first broker is executed, wherein the first broker assigns responsibility of execution for the task to the one or more worker threads in the first set of co-located worker threads, wherein in response to a failure associated with a first worker thread in the first set, the first broker reassigns the responsibility of execution for the task to a second worker thread in the first set, wherein in response to a failure associated with the first broker, a second broker assigns responsibility of execution for the task to one or more co-located worker threads.

20 Claims, 8 Drawing Sheets

TASK EXECUTION AND MANAGEMENT IN A CLUSTERED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the management of tasks in a clustered computing environment and, more particularly, to a system and method for executing and managing tasks to completion.

BACKGROUND

A clustered computing environment typically includes a large set of remotely connected computing nodes. Often each node has a set of independent compute, memory and storage resources interconnected by a shared network and often utilizing shared resources, such as a file system, a database or other component. A cluster of computing nodes may be utilized to service requests submitted by one or more software applications. Each software application may be composed of several threads that utilize one or more resources to perform certain tasks.

A resource utilized by a thread in a clustered computing environment may be a physical or a virtual computational entity (e.g., a host machine or a virtual machine) of limited availability which may or may not be immediately available for access by a thread. Since the successful execution of the thread depends on various resources, if a resource utilized by the thread becomes unreachable, unavailable, or otherwise non-functional, the thread may not be able to complete an assigned task until the particular resource on which the thread depends becomes available again.

Examples of resource dependencies include dependency on results generated by other threads, shared data stored in a database or file system which may be needed for the thread to complete the execution of a task, etc. As such, the execution of a task may not be successfully completed by a thread, if for example a different thread which is called synchronously and depends on other currently unavailable resources fails to respond, or if a database cannot lock a required resource that needs to be accessed by the thread, or if shared storage on which the thread depends to store data is full, or if a computing node on which the thread is running has insufficient memory to support the completion of a task.

In the above scenarios, a thread may not be able to complete the task in a timely expected manner, but the thread, given some time, may be able to complete the task once the missing, delayed or failed resources become available. Depending on implementation, some systems may be designed so that a thread can provide a guarantee to a higher level component indicating that a currently suspended task will be completed in the future, so that the other system components may continue to properly function and operate without having to wait for the particular task to be completed.

The point in time in which a thread guarantees to complete a target task when resources become available is sometimes referred to as a roll forward point. A management mechanism needs to be in place to ensure that the target task will be completed by the responsible thread. State of the art mechanisms used for this purpose typically are unable to provide or implement a highly reliable or highly available and efficient roll forward point mechanism that is configurable or scalable to support the desired levels of replication for the target task.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for task management in a computer implemented system are provided. The method comprises registering a task with one or more brokers residing on one or more nodes to manage the execution of a task to completion, wherein a first broker is accompanied by a first set of worker threads co-located on the node on which the first broker is executed, wherein the first broker assigns responsibility of execution for the task to the one or more worker threads in the first set of co-located worker threads, wherein in response to a failure associated with a first worker thread in the first set, the first broker reassigns the responsibility of execution for the task to a second worker thread in the first set, wherein in response to a failure associated with the first broker, a second broker assigns responsibility of execution for the task to one or more co-located worker threads.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, a task execution management system for a clustered operational environment with a plurality of nodes is provided in which independent but exchangeable nodes communicate over a shared network. Task registration and management services are implemented wherein one or more designated management entities (i.e., brokers) monitor and manage the completion of registered tasks in case of failure of responsible nodes or related resources.

Figure 1:
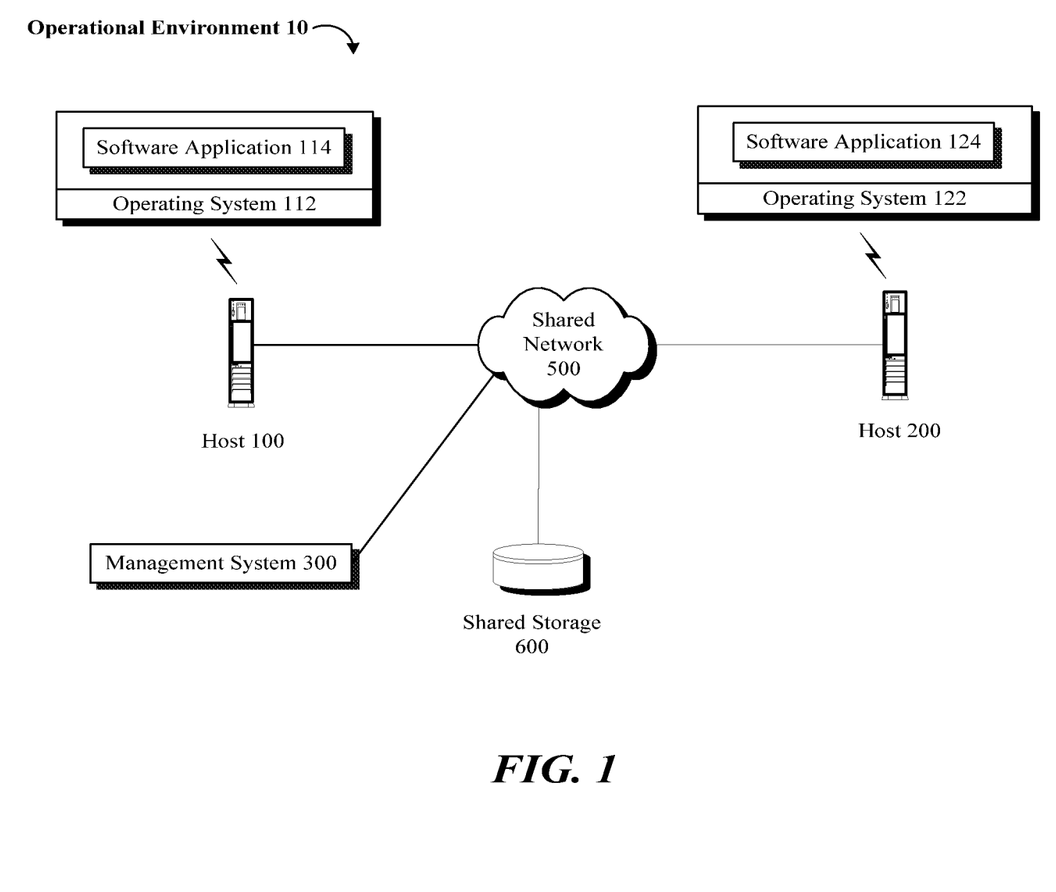
FIG. 1 illustrates an exemplary operational environment in accordance with one or more embodiments, wherein one or more hosts are provided to service a plurality of requests.

Referring to FIG. 1, an exemplary operating environment 10 may comprise a plurality of nodes (e.g., hosts 100, 200, etc.) wherein a host 100 provides a platform for the execution of an operating system 112 over which a software application 114 may be executed. Software application 114 may spawn one or more threads to perform one or more tasks. In accordance with one embodiment, prior to executing a task by an application thread, the task may be first assigned a unique task id. If it is desirable to set a roll forward point for the task, the task may be registered or associated with a parameter indicating a desired replication level.

As explained in further detail below, prior to scheduling a task for execution, a worker thread may be assigned to perform the task. The worker may be known to a management system 300 in advance or may be assigned when needed. Management system 300, as referred to herein, may be an independent entity or an embedded mechanism that is a part of one or more of an application, a thread, a broker or other entity that is involved in servicing or managing the execution of a task. As such, at the time of committing a task to a worker, the identity of the worker that is to execute the task may be provided. In one implementation, a generic worker may be employed to execute a task, such that the task is described by the thread when the thread commits the task for execution.

The replication level for a task is an indication of a level of assurance that is desirable for ensuring that a registered task is executed to completion regardless of potential failures in the related resources. For example, in one embodiment, the replication level is a factor of the number of brokers associated with the task, where a higher number provides better assurance that the task will be completed. A task may be registered with as many brokers as defined by the desired replication level. It is noteworthy that the task may be implicitly registered with one or more brokers through the use of a shared resource available to all brokers (e.g., a shared database).

In one embodiment, a task may be registered with any subset of the brokers in the clustered operational environment 10 by way of a management system 300, for example. In one implementation, different subsets of brokers may serve different tasks. For example, a first task for a first thread may be assigned to a first group of brokers and a second task for the same thread may be assigned to a second group of brokers. If the management system 300 cannot associate the task with the number of brokers needed to support the desired replication level, the task may be associated with the next highest possible number of available brokers, in one implementation.

A broker may store information about a registered task in volatile memory, for example, and replicate the task to one or more locally or remotely available data storage mediums. Optionally, the management system 300 may keep track and identify the brokers associated with a task about the status or wellbeing of other brokers that have been associated with the task. Depending on implementation, under certain fault scenarios, management system 300 or different brokers associated with a task may maintain different lists of other brokers that are also associated with the task so that if one broker fails other associated brokers take over the responsibilities of the failed broker, as provided in further detail below.

Figure 2A:
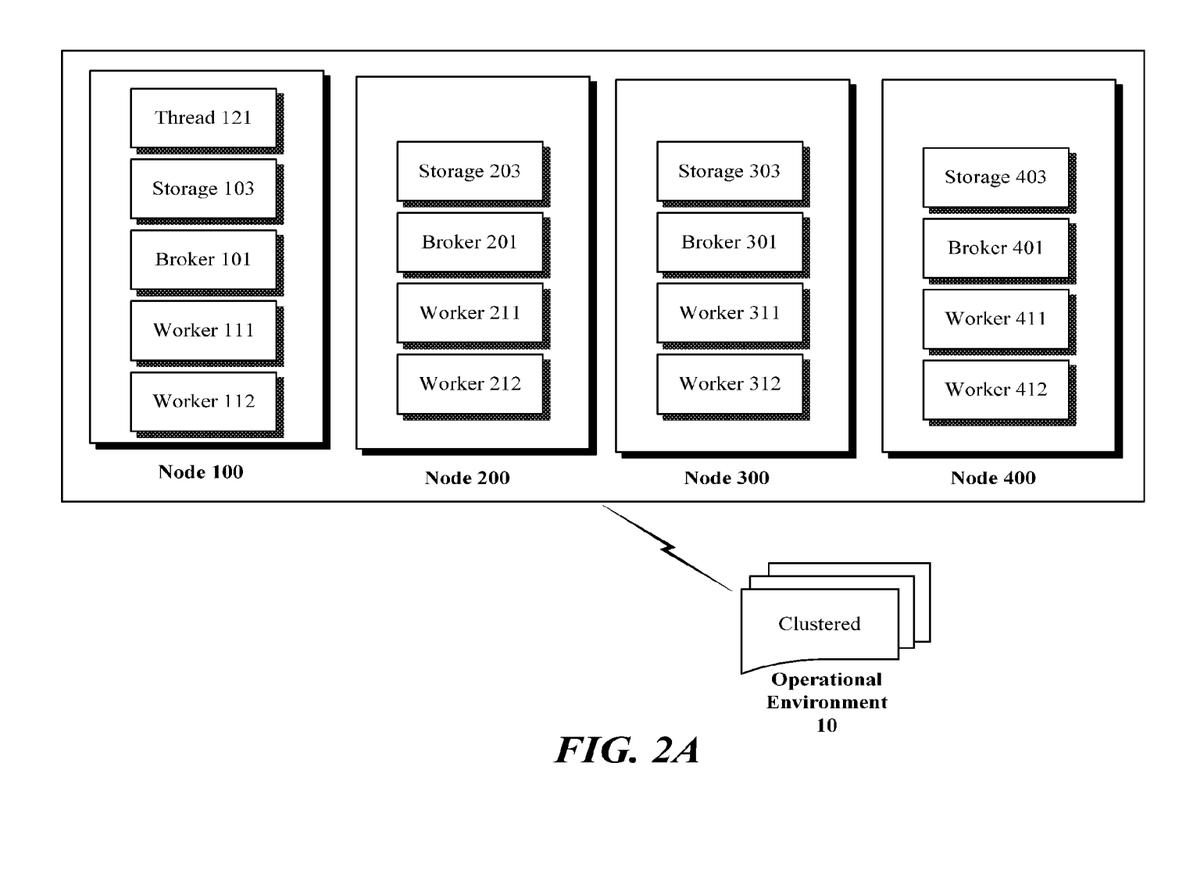
FIG. 2A is an exemplary block diagram of a plurality of nodes in a clustered operational environment having various resources, in accordance with one embodiment.

Referring to FIG. 2A, an example clustered operational environment 10 is shown in which nodes 100, 200, 300 and 400 are independent nodes with optionally dedicated components. Each node may for example comprise a storage medium, a thread, a broker and worker threads. As illustrated, a number of brokers (101, 201, 301, 401) and one or more application workers (111, 112, 211, 212, 311, 312, 411, 412) are added to a set of clustered nodes (100, 200, 300 and 400) which is a given subset of all cluster nodes upon which the application is running. A worker may be associated with a broker located preferably on the same node (e.g., workers 111, 112 may be associated with broker 101 on node 100). One or more application threads may be running on the nodes. If a thread may register a task for execution by addressing one or more node brokers. Following task registration, the node brokers would ensure task execution by at least one worker.

In one embodiment, a thread may register a task with any subset of the brokers in the clustered operational environment 10. In one example, a broker may use a shared media available to other brokers to keep a record of a registered task. The registered task may be registered with more than one broker such that different subsets of brokers may serve different tasks. For example, a first task for a first thread may be assigned to a first group of brokers and a second task for the same thread may be assigned to a second group of brokers. If the thread committing a task is unable to associate the task with the number of brokers needed to support the desired replication level, the task may be associated with the next highest possible number of available brokers, in one implementation.

A broker may store information about a registered task in volatile memory, for example, and replicate the task to one or more locally or shared data storage mediums. Optionally, a management system 300 may offer information to a broker about the status or wellbeing of other brokers. Alternatively the broker may monitor other brokers without the use of management system 300. A broker in this way may determine if other brokers that have been associated with a task are healthy. Depending on implementation, under certain fault scenarios, management system 300 different brokers associated with a task may maintain lists of other brokers that are also associated with the task so that if one broker fails other associated brokers take over the responsibilities of the failed broker, as provided in further detail below. Depending on implementation, under certain fault scenarios, brokers not associated with a task may identify that a broker associated with a task is no longer available and may take over the responsibilities of the failed broker, as provided in further detail below.

Application threads (e.g. thread 121) and workers may use a resource normally available to an application (not shown in FIG. 2) while processing tasks assigned to threads spawn by the application. A task may be executed by at least one worker on a node or may also be executed by a thread. For example, a task executed by thread 121 on node 100 may be assigned to a worker 111 by broker 101 when the task is registered with broker 101. Broker 101 may use the local node's compute, memory and storage resources (or other nodes' resources) for managing the completion of the task. In some embodiments, broker 101 may also use one or more shared resources (e.g. a shared network) to manage the completion of a task.

Figure 2B:
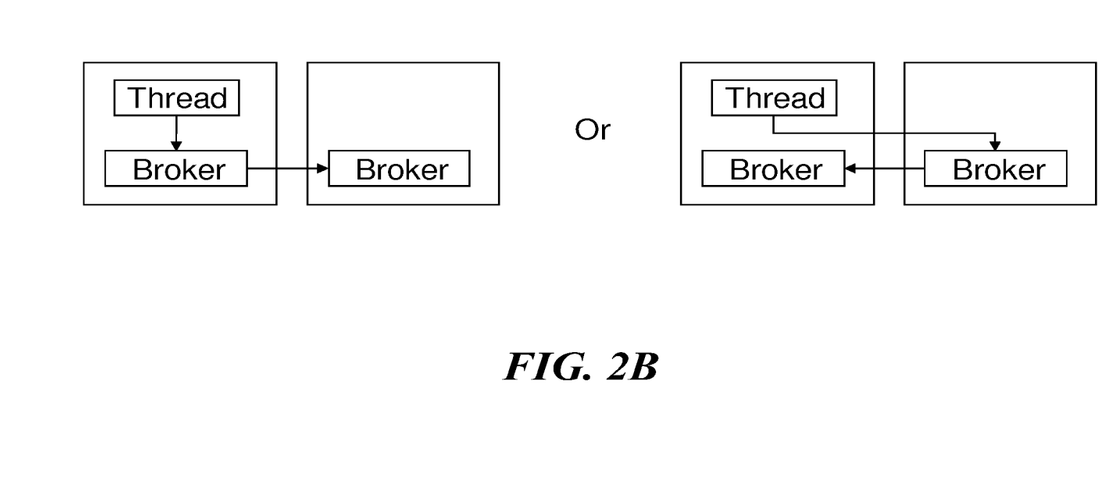
FIGS. 2B through 2D illustrate exemplary embodiments of different possible implementations for registering a task with one or more brokers in accordance with one or more embodiments.
Figure 2C:
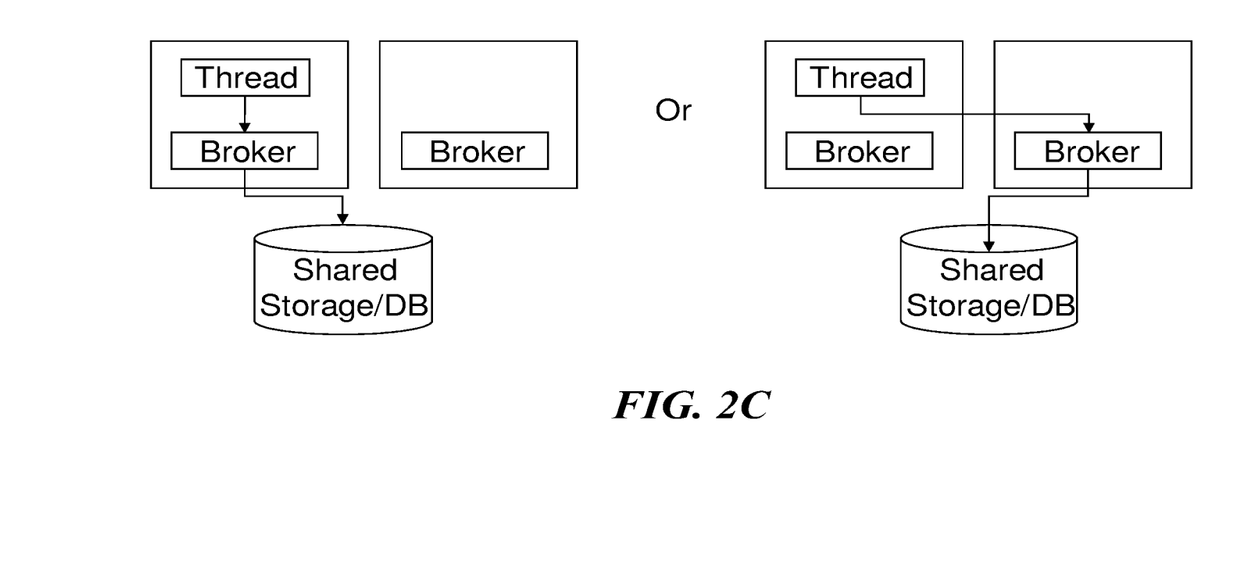
Figure 2D:
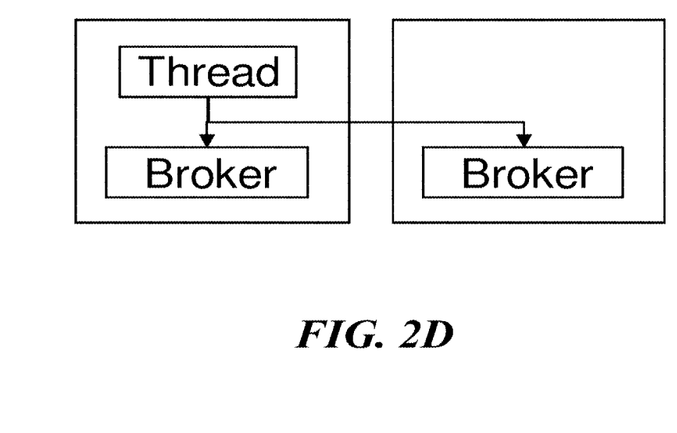

FIGS. 2B through 2D illustrate exemplary embodiments of different possible implementations for registering a task with one or more brokers. In the examples shown in FIG. 2B, a thread registers a task with a first broker and the first broker registers the task with a second broker. In alternate example scenarios, shown in FIG. 2C, a thread registers a task with a first broker and the first broker writes the task to a shared storage or database accessible by other brokers, such that if the first broker fails, the other brokers may take over management of the task. In the example shown in FIG. 2D, a thread registers a task with a plurality of brokers. In the above examples, the brokers may be running on the same or different hosts or nodes than the host on which the thread is executed.

In one implementation, a broker may be executed on every node such that the thread is assured that there is a broker in a local node and does not rely on a broker running on a remote node. Optionally, each thread may have a default association with a broker (e.g., a local broker) without relying on other brokers or mechanisms external to the local node. It is noteworthy that depending on implementation, externally available mechanisms may be used by a thread or a broker, if available, in order to identify the status or availability of brokers that may not be local to the thread. This can be helpful to any of the three options above.

Figure 3:
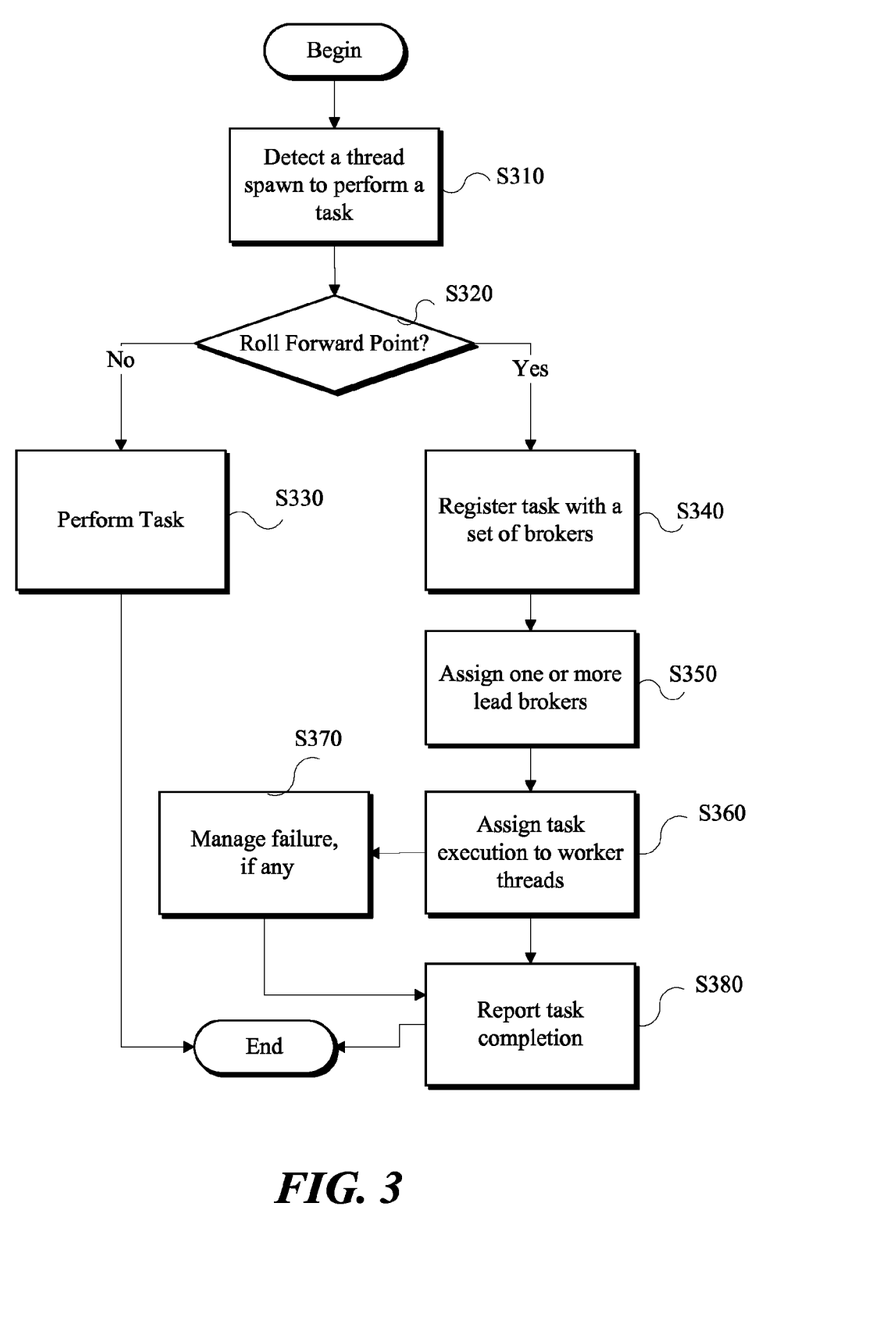
FIG. 3 is a flow diagram of an exemplary method for managing completion of tasks in accordance with one embodiment.

Referring to FIG. 3, more generally, when a thread is spawned to perform a task (S310), it may be decided whether a task may is to go through a roll forward point to ensure that the tasks will be fully executed (S320). If not, the task is performed without setting any tracking or desired replication level for the task (S330). In this latter scenario, in case of a failure of a resource or a node, no mechanisms would be in place to ensure the completion of the task. However, if the thread decides to register the task, it would register the task with a set of one or more brokers (S340) and one or more lead brokers from among the set of brokers may be assigned to take on the responsibility to see that the task is executed to completion (S350).

As mentioned earlier, depending on implementation different brokers may serve as designated brokers to different tasks. The brokers associated with a task common to them will be notified about the identity and involvement of the other brokers and whether or not a broker is designated as a lead broker. If a task is registered with more than one broker, then the brokers are notified by the thread or a management system 300 of a list of brokers with which that task is registered. A lead broker for the task may be chosen by the management system 300, the brokers or possibly based on the thread's request. A lead broker assigns the execution of a registered task to one or more worker thread (S360). A lead broker may also maintain a mapping between the corresponding workers and tasks.

When a task completes, a worker may report the task's completion to the lead broker (S380). A lead broker may delete the completed task from the shared media or notify the other involved assigned brokers of the completion of the task. Otherwise, if a failure or other type of problem arises, the lead broker manages the failure by trying to reschedule the execution of the task until it is completed (S370). For example, if a worker thread assigned to the execution of the task fails or is aborted, a lead broker restarts that task by assigning the execution of the task to another worker thread. In another example, if a broker hosted by a node fails, the node restarts the broker. The broker then determines whether it is the lead for the execution of any tasks by accessing a storage medium used for saving the related data.

If a node on which as task is executed fails without recourse, the management system 300 may notify other brokers of the failure and at least a replacement lead broker is assigned to ensure that the task is re-executed and completed. As mentioned earlier, in one embodiment, prior to executing a task, the task is assigned a unique task ID and is assigned to one or more brokers. The task unique ID may be assigned by the thread that wishes to execute the task and the ID may be a derivative of a thread ID or a signature of the task, for example. In another embodiment, the unique ID is assigned by one of the brokers to be a derivative of a broker ID, for example.

Depending on implementation, at the time a task is registered, a priority for executing the task and optionally the identity of the application or of a worker thread for executing the task is provided. A time interval during which the task may be executed may be also provided when the task is registered. In one example, the number of brokers with which a task is registered depends on the task parameters or system parameters. If the desired number of brokers cannot be achieved when the task is first registered, the system informs the application and tries to record the task with additional brokers to meet the desired level.

In accordance with one embodiment, the set of brokers is subdivided to failure zones. A desired number of brokers may be associated with more than one failure zone such that a fault of a failure zone will allow the task to continue being served. A service broker may store the task in volatile memory and one or more replicas of the task in non-volatile storage available to the broker in case of node or broker faults. The broker may use one or more local disks to store the task replicas until, for example, the level of replication reaches a predefined threshold or until a satisfactory level is reached.

In one embodiment, a broker may ask other brokers to store task replicas until the level of replication reaches a predefined threshold or the task is completed. A request by a broker may come following task registration or following a failure occurring at a later time that reduces the replication level of a task below the initial replication level, or following an improvement in the state of the system that allows a broker to register a task with additional replicas not previously available, in order to meet the desired replication level. A broker may use multiple local replicas located on different disks to store task replicas. A broker may use a shared file system or a database to store task replicas. When a lead broker is declared faulty, the other brokers may request that a new broker to replace the faulty broker.

In certain implementations, each registered task may have a different lead broker. The thread executing the task may designate the lead broker. The lead broker may be a broker on the local node or a broker on a node remote to the thread. Optionally, a lead broker may be designated either randomly or by way of a vote taken from a plurality of brokers to which a task is assigned or based on other factors, such as the work load of a broker in relation to other brokers. In one embodiment, one or more non-lead brokers may be designated as lead, if for example the node in which the lead broker resides is declared faulty, or becomes unavailable due to load balancing measures, or if the task fails at the server of the designated broker.

In one embodiment, when a non-lead broker is declared faulty, the lead broker may request a new broker to become a non-lead broker for the task. In a non-limiting implementation, brokers may use a distributed algorithm for choosing one of them as a lead broker, for example, where the lead broker provides the workers associated with that broker with tasks to be executed. The lead broker or other independent entity may maintain a mapping between the workers associated with that broker and tasks, as well as the list of task brokers. If a worker completes the task, other brokers are so notified. If a worker aborts a task, the worker notifies the lead broker and the lead broker reschedules the task for execution.

As noted earlier, lead broker may maintain a copy of the mapping between workers and tasks in non-volatile storage. One or more brokers may maintain a list of all brokers serving the task, for example, and provide that list to the worker threads. A worker may be responsible for notifying the brokers when the task completes. And the lead broker may be responsible for notifying other brokers or any broker that had not been notified by the worker that the task has completed. A worker that aborts a task may request that the task be delayed and attempted again not before a given interval has passé, or the worker may request a change of priority level for the task.

If a resource is or becomes unavailable or fails, in one embodiment, a worker may indicate to the lead broker which resource is unavailable, such that the task is restarted after the resource becomes available. If a broker is restarted, the restarted broker may be configured to determine which tasks assigned to it remain in an uncompleted status. Said status information may be stored in a storage medium which is accessible by the broker. Following recovery, the broker may inquire from other brokers if a task was completed, or try to determine the broker that is the lead for a task that is assigned to the broker that has recovered.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
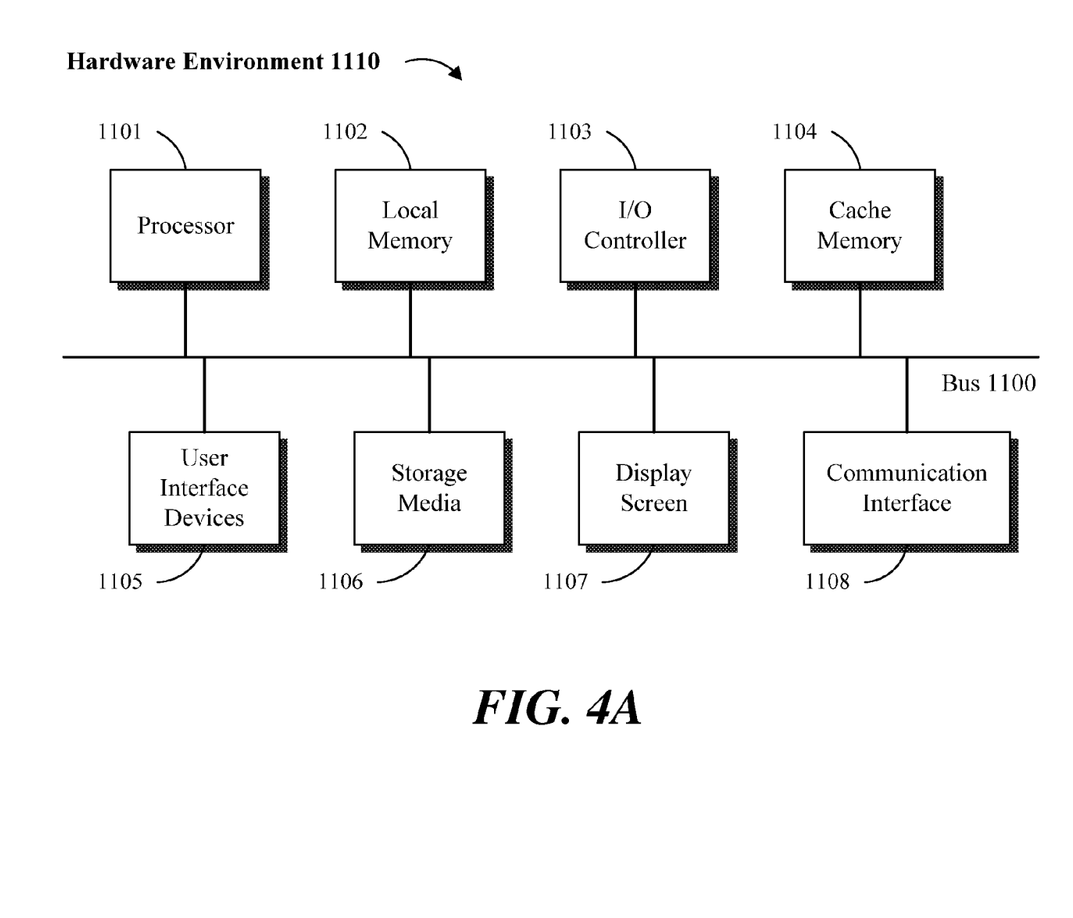
FIGS. 4A and 4B are block diagrams of hardware and software environments in which the disclosed systems and methods may operate, in accordance with one or more embodiments.
Figure 4B:
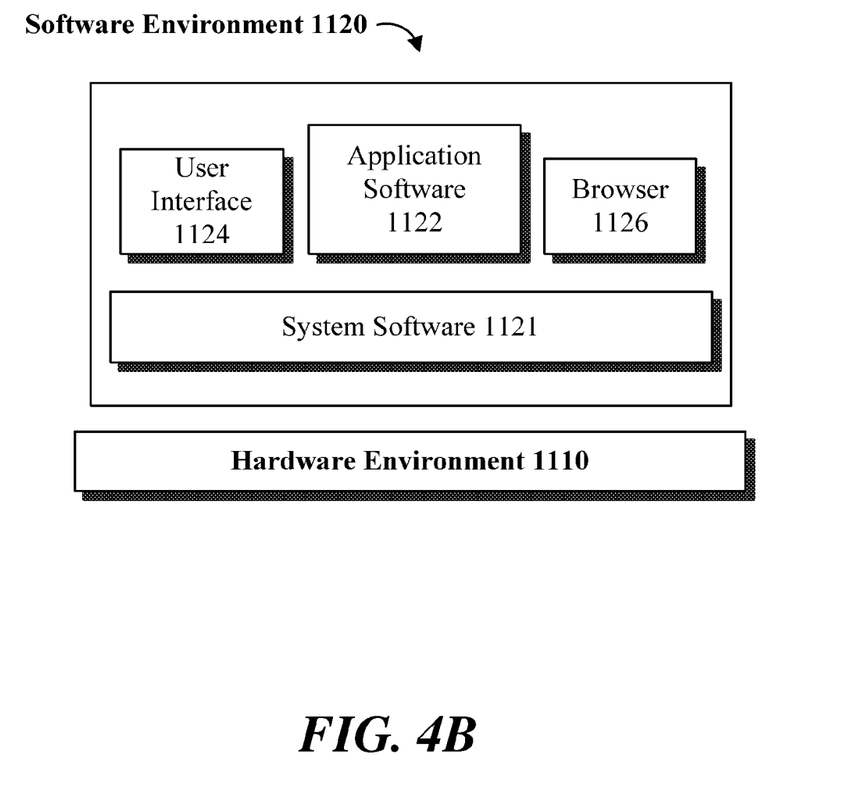

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A task management method in a computer implemented system, the method comprising:
   registering a task with one or more brokers residing on one or more nodes to manage the execution of the task to completion,
   designating a lead broker based on one or more of: a random designation, a vote taken from a plurality of brokers, or a workload of a broker in relation to other brokers,
   wherein a first broker is accompanied by a first set of dedicated worker threads co-located on the one or more nodes on which the first broker is executed,
   wherein the first broker assigns responsibility of execution for the task to the one or more dedicated worker threads in the first set of dedicated worker threads,
   wherein in response to a failure associated with a first dedicated worker thread in the first set of dedicated worker threads, the first broker reassigns the responsibility of execution for the task to a second dedicated worker thread in the first set of dedicated worker threads,
   wherein in response to a failure associated with the first broker, a second broker assigns responsibility of execution for the task to one or more dedicated worker threads of a second set of dedicated worker threads co-located on one or more nodes with the second broker,
   wherein the designated lead broker requests one or more brokers to store replicas of the task until a level of replication reaches a predefined threshold, and
   wherein in response to the task being completed, the lead broker performs one or more of: notifying the requested one or more brokers of the completion of the task, and deleting the task from shared storage.

2. The method of claim 1, wherein the designated lead broker assigns responsibility of execution for the task to one or more co-located dedicated worker threads, wherein in response to a failure associated with the lead broker, at least one substitute broker is designated as the lead broker.

3. The method of claim 1, wherein in response to a failure associated with a broker with which the task is registered, the task is registered with at least a second broker with which the task was not previously registered.

4. The method of claim 1, wherein once the task is successfully completed, a dedicated worker thread reports the completion to a co-located broker.

5. The method of claim 1, wherein once the task is successfully completed, a broker reports the completion of the task to other brokers.

6. The method of claim 1, wherein a first task is registered with the one or more brokers by way of at least one of an application thread and a dedicated worker thread executing a second task.

7. The method of claim 6, wherein the application thread is executed on the one or more nodes on which the first broker is executed.

8. The method of claim 1, wherein the first broker is co-located with different types of dedicated worker threads serving different types of tasks, wherein the first broker assigns the responsibility of execution for the task to a dedicated worker thread based on information derived from the task.

9. The method of claim 1, wherein a registered task comprises at least one or more of a unique identity of the task, priority of the task compared to other tasks, time for execution of the task, identity of external resources required for executing the task, type of the dedicated worker that is to execute the task, type of task to be executed by the dedicated worker thread, code to be executed by a dedicated worker thread, or parameters to be used by the dedicated worker thread while executing the task.

10. The method of claim 2, wherein a shared resource is available to the one or more brokers, wherein the shared resource is used to store at least one or more of the task, the identity of the lead broker, or a list of one or more brokers to which the task is registered.

11. A task management system in a computer implemented system, the system comprising a processor coupled with memory:

a logic circuit for registering a task with one or more brokers residing on one or more nodes to manage the execution of a task to completion, a logic circuit for designating a lead broker based on one or more of: a random designation, a vote taken from a plurality of brokers, or a workload of a broker in relation to other brokers, wherein a first broker is accompanied by a first set of dedicated worker threads co-located on the one or more nodes on which the first broker is executed, wherein the first broker assigns responsibility of execution for the task to the one or more dedicated worker threads in the first set of co-located dedicated worker threads, wherein in response to a failure associated with a first dedicated worker thread in the first set, the first broker reassigns the responsibility of execution for the task to a second dedicated worker thread in the first set, wherein in response to a failure associated with the first broker, a second broker assigns responsibility of execution for the task to one or more of a second set of dedicated worker threads co-located on one or more nodes with the second broker, wherein the designated lead broker requests one or more brokers to store replicas of the task until a level of replication reaches a predefined threshold, and wherein in response to the task being completed, the lead broker performs one or more of: notifying the requested one or more brokers of the completion of the task, and deleting the task from shared storage.

12. The system of claim 11, wherein the designated lead broker assigns responsibility of execution for the task to one or more co-located dedicated worker threads, wherein in response to a failure associated with the lead broker, at least one substitute broker is designated as the lead broker.

13. The system of claim 11, wherein in response to a failure associated with a broker with which the task is registered, the task is registered with at least a second broker with which the task was not previously registered.

14. The system of claim 11, wherein once the task is successfully completed, a dedicated worker thread reports the completion to a co-located broker.

15. The system of claim 11, wherein once the task is successfully completed, a broker reports the completion of the task to other brokers.

16. A computer program product comprising a hardware computer readable storage device having a computer readable program, wherein the computer readable program when executed on a computer causes the computer to:

register a task with one or more brokers residing on one or more nodes to manage the execution of a task to completion, designate a lead broker based on one or more of: a random designation, a vote taken from a plurality of brokers, or a workload of a broker in relation to other brokers, wherein a first broker is accompanied by a first set of dedicated worker threads co-located on the one or more nodes on which the first broker is executed, wherein the first broker assigns responsibility of execution for the task to the one or more dedicated worker threads in the first set of co-located dedicated worker threads, wherein in response to a failure associated with a first dedicated worker thread in the first set, the first broker reassigns the responsibility of execution for the task to a second dedicated worker thread in the first set, wherein in response to a failure associated with the first broker, a second broker assigns responsibility of execution for the task to one or more of a second set of dedicated worker threads co-located on one or more nodes with the second broker, wherein the designated lead broker requests one or more brokers to store replicas of the task until a level of replication reaches a predefined threshold, and wherein in response to the task being completed, the lead broker performs one or more of: notifying the requested one or more brokers of the completion of the task, and deleting the task from shared storage.

17. The computer program product of claim 16, wherein the designated lead broker assigns responsibility of execution for the task to one or more co-located dedicated worker threads, wherein in response to a failure associated with the lead broker, at least one substitute broker is designated as the lead broker.

18. The computer program product of claim 16, wherein in response to a failure associated with a broker with which the task is registered, the task is registered with at least a second broker with which the task was not previously registered.

19. The computer program product of claim 16, wherein once the task is successfully completed, a dedicated worker thread reports the completion to a collocated broker.

20. The computer program product of claim 16, wherein once the task is successfully completed, a broker reports the completion of the task to other brokers.

* * * * *